(12) United States Patent
Doerr et al.

(10) Patent No.: US 6,519,059 B1
(45) Date of Patent: Feb. 11, 2003

(54) WAVELENGTH DIVISION ADD/DROP MULTIPLEXER

(75) Inventors: Christopher Richard Doerr, Middletown, NJ (US); Randy Clinton Giles, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/408,932

(22) Filed: Sep. 30, 1999

(51) Int. Cl.[7] .................................................. H04J 14/02
(52) U.S. Cl. ........................ 359/124; 359/127; 359/128; 359/114
(58) Field of Search ................................. 359/124, 127, 359/119, 128, 123, 114, 117, 125, 139

(56) References Cited

U.S. PATENT DOCUMENTS

| | | | | |
|---|---|---|---|---|
| 5,002,350 A | * | 3/1991 | Dragone | ...................... 359/124 |
| 5,136,671 A | * | 8/1992 | Dragone | ...................... 385/17 |
| 5,526,153 A | * | 6/1996 | Glance | ...................... 359/127 |
| 6,236,781 B1 | * | 5/2001 | Doerr et al. | ................. 359/124 |
| 6,429,974 B1 | * | 8/2002 | Thomas et al. | ............. 359/111 |
| 6,433,900 B1 | * | 8/2002 | Kuroyanagi et al. | ........ 359/110 |
| 6,452,703 B1 | * | 9/2002 | Kim et al. | .................. 359/119 |

* cited by examiner

Primary Examiner—Nina Tong

(57) ABSTRACT

An arrangement is disclosed for providing optical wavelength adding/dropping. The arrangement includes two duplicated-port waveguide grating routers (WGR) and a plurality of attenuator-switches. The first WGR is configured as a 1×2N demultiplexer and the other as a 2N×1 multiplexer. Each WGR includes a duplicated plurality of input or output waveguides, wherein respective pairs of each plurality have substantially identical spectral characteristics. The first plurality of output waveguides of the first WGR is coupled to the first plurality of input waveguides of the second WGR. Attenuator-switches are inserted between these two pluralities of waveguides that can be used to block incident optical wavelengths corresponding to channels to be terminated at the node where the arrangement is provided. The second plurality of output waveguides in the first WGR are drop waveguides where dropped channels exist. The second plurality of input waveguides in the second WGR are add waveguides to provide full add/drop capability. Once all of the appropriate adds/drops are accomplished, the channels are multiplexed by the second WGR.

22 Claims, 5 Drawing Sheets

500

US 6,519,059 B1

WAVELENGTH DIVISION ADD/DROP MULTIPLEXER

FIELD OF THE INVENTION

This invention relates to an optical wavelength division multiplexing (WDM) add/drop arrangement.

BACKGROUND OF THE INVENTION

In a long-haul, high-capacity wavelength division multiplexing (WDM) optical network, the capability to remove and replace selective WDM wavelengths at multiple add/drop nodes across the network is essential for a variety of value-added communication services. Such communication services include local access, interactive multimedia and wavelength leasing. In particular, this capability requires adding or dropping one or more optical wavelengths (also known as channels) at each add/drop network node from a multiwavelength-multiplexed signal as well as substituting one or more optical wavelengths with new optical wavelengths.

WDM add/drop systems have been disclosed in the prior art. Such systems have been constructed by pairing two waveguide grating routers (WGR), the first a 1×N wavelength demultiplexer and the second a N×1 passive wavelength combiner or multiplexer. In addition, an array of optical switches operate on a subset of the N wavelength interconnections between these two WGRs to remove, add and replace selective optical wavelengths (a system of this sort is disclosed in U.S. Pat. No. 5,526,153, entitled "Optical Channel Adding/Dropping Filter", issued to Glance on Jun. 11, 1996). In such a system, a multiwavelength-multiplexed signal is first demultiplexed, in the first WGR (e.g., the demultiplexer) to yield a multiplicity of individual optical wavelengths. Thereafter, a subset of the demultiplexed optical wavelengths is directed to the optical switches where either a drop, add, or a drop and add of one or more of the individual optical wavelengths takes place. Subsequently, the individual wavelengths are directed to the second WGR (e.g., the multiplexer) to produce a new multiwavelength-multiplexed signal. The optical multiplexers and demultiplexers used in such add/drop systems are further described in U.S. Pat. No. 5,002,350, entitled "Optical Multiplexer/Demultiplexer", and U.S. Pat. No. 5,136,671, entitled "Optical Switch, Multiplexer, and Demultiplexer" both issued to Dragone on Mar. 26, 1991 and Aug. 4, 1992, respectively.

Although such WDM add/drop systems are effective for dropping and adding wavelengths, they add significant cost to optical networks since they require an array of expensive optical switches. With increased market competition and heightened customer expectations, it has become important to develop a low-cost WDM add/drop system.

SUMMARY OF THE INVENTION

An optical wavelength division add/drop multiplexer (WADM) arrangement in accordance with the principles of the present invention includes a pair of optical routers, such as waveguide grating routers (WGRs), wherein at least one of the optical routers includes a duplicated plurality of input or output waveguides. Certain waveguides associated with each optical router are coupled together and at least one attenuator-switch, such as a micro-electromechanical system (MEMS) optical shutter, is interconnected between the coupled waveguides.

In one illustrative embodiment, the WADM arrangement includes two duplicated-port waveguide grating routers (DWGR) and a plurality of optical shutters. The first DWGR is configured as a 1×2N demultiplexer, which demultiplexes an optical multiplexed signal into a duplicated plurality of channels. The other DWGR is configured as a 2N×1 multiplexer. Each DWGR includes a duplicated plurality of input or output waveguides, wherein respective pairs of each duplicated plurality of waveguides have substantially identical spectral filtering characteristics. The first plurality of output waveguides of the first DWGR, which are coupled to the first plurality of input waveguides of the second DWGR, propagate one of the duplicated plurality of channels. Optical shutters are inserted between respective waveguides of these two pluralities of waveguides and can be used to block or reflect incident optical wavelengths corresponding to channels to be terminated at the node where the WADM arrangement is provided. The second plurality of output waveguides in the first DWGR propagate the other duplicated plurality of channels and drop these channels at the node where the WADM arrangement is provided. Lastly, the second plurality of input waveguides in the second DWGR are for adding channels to provide full add/drop capability. Once all of the appropriate adds/drops are accomplished, the channels propagating in the first and second input waveguides are multiplexed by the second DWGR. Thus, in addition to conventional add/drop capability, the WADM arrangement has a so-called "drop and continue" functionality, wherein channels are both dropped at a particular node and may also continue to further nodes in an optical network.

In contrast with the prior art, the present invention, by virtue of the DWGRs and a unique configuration, achieves add/drop as well as drop and continue functionality while reducing the cost of conventional WADM nodes in optical networks. The optical switches used in typical WADM nodes are not needed; the optical shutters that are present in this invention are much less expensive.

BRIEF DESCRIPTION OF THE DRAWING

The invention will be more fully understood from the following detailed description of an illustrative embodiment taken in conjunction with the appended figures in which.

DETAILED DESCRIPTION OF THE INVENTION

Figure 1:
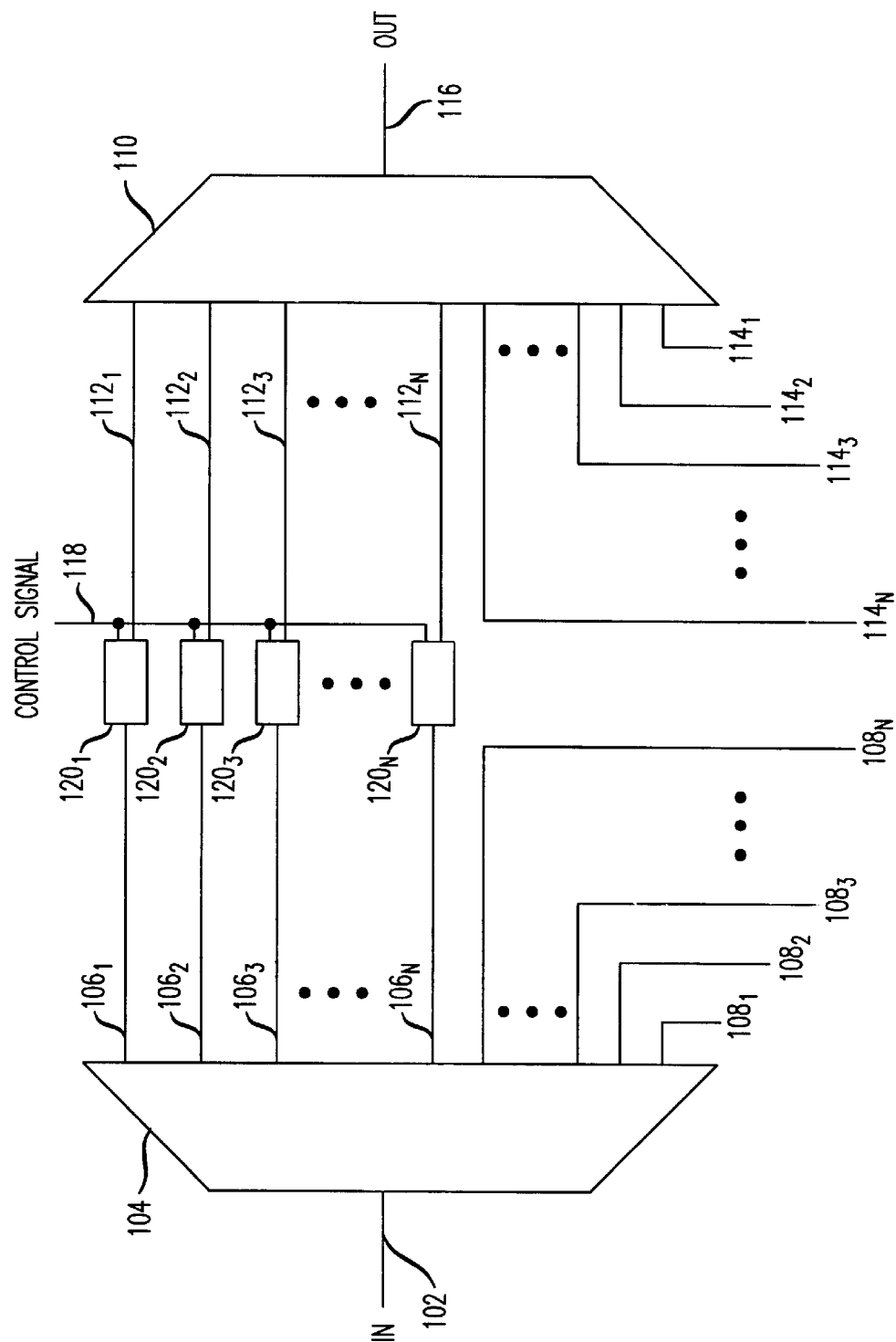
FIG. 1 shows a block diagram of an illustrative embodiment of the WADM arrangement in accordance with the principles of the present invention for selectively adding/dropping optical channels.

FIG. 1 shows a block diagram of an illustrative embodiment of a WADM arrangement for selectively adding/dropping/substituting optical channels from an optical multiplexed signal in accordance with the principles of the present invention. An input waveguide 102, typically an optical fiber, serves as the input of the WADM arrangement.

The input supplies an optical multiplexed signal, for example an N channel wavelength division multiplexed signal, to a first optical router 104. Optical router 104 has 2N output optical waveguides that form two sets of N waveguides each. The first set includes N waveguides $106_1$–$106_N$, and the second duplicate set of waveguides includes waveguides $108_1$–$108_N$. Hereinafter each waveguide set is known collectively as waveguides 106 and 108 respectively, and the arrangement is said to have a duplicated plurality of waveguides. A second optical router 110 has 2N input optical waveguides, waveguides $112_1$–$112_N$, and a duplicate set of waveguides $114_1$–$114_N$. Hereinafter each waveguide set is known collectively as waveguides 112 and 114 respectively. As will be described in more detail below, respective pairs of waveguides 106 and 108 and waveguides 112 and 114 have substantially identical spectral characteristics (for example, waveguide $106_1$ propagates a substantially equivalent wavelength (e.g., $\lambda_1$) as waveguide $108_1$). Waveguides 106 and 112 interconnect optical router 104 to WGR 110. As shown in FIG. 1, waveguides 108 of optical router 104 drop channels at a particular network node and waveguides 114 of optical router 110 can add channels at the particular network node. Lastly, output waveguide 116 serves as an output of the WADM arrangement.

Between respective pairs of waveguides 106 and waveguides 112 of the input and output optical routers and along the wave path are attenuator-switches $120_1$–$120_n$, hereinafter known collectively as attenuator-switches 120. In a preferred embodiment, the attenuator-switches are optical shutters, which are described in more detail below. When open, an attenuator-switch permits any optical signal exiting an output waveguide 106 of optical router 104 to pass through to an input waveguide 112 of optical router 110 with minimum loss. When closed, an attenuator-switch absorbs or reflects, desirably with high efficiency, an incident optical channel preventing the channel from reaching optical router 110. Lead 118 receives a control signal from a source (not shown) to open and close the attenuator-switches 120. As will be understood by persons skilled in the art, the control signal may be generated by any conventional means including, but not limited to: 1) local control, such as a central office network control operator; 2) remote control, such as a network control center; 3) automated through the use of dynamic network reconfiguration software; or 4) manual control.

Operationally, an optical multiplexed signal is directed to the WADM arrangement of FIG. 1, wherein: (1) channels of the multiplexed signal may be dropped, (2) new channels, absent from the original optical multiplexed signal, may be added, (3) channels may be replaced by other channels which have the same carrier frequency channel, but which contain a different modulated signal, or (4) the channels may pass through substantially unchanged.

Figure 2:
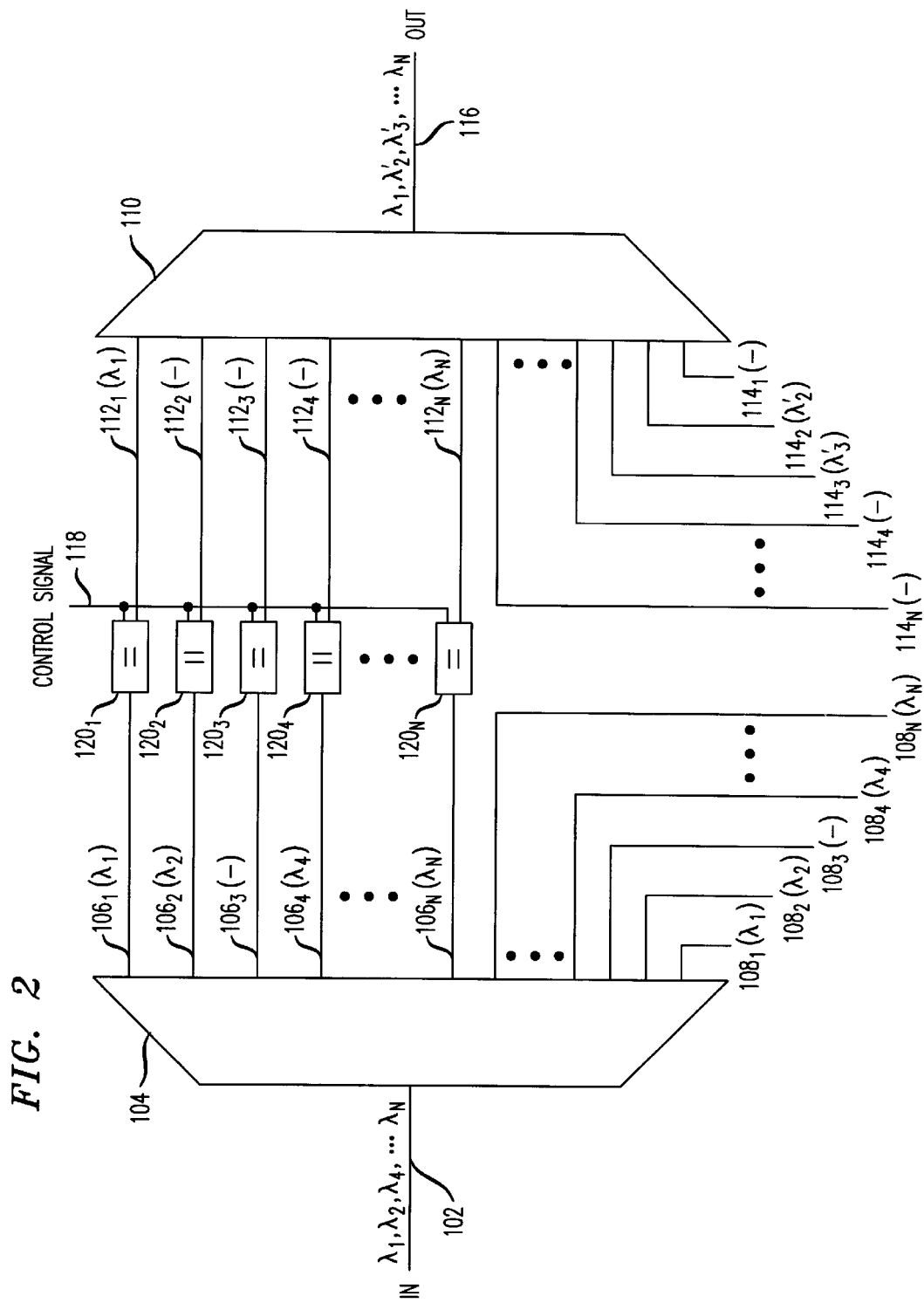
FIG. 2 shows a block diagram of one exemplary configuration of the embodiment of FIG. 1 selectively adding/dropping/substituting optical channels.

FIG. 2 illustrates the manner in which an exemplary optical multiplexed signal (represented by and includes the following channels $\lambda_1 \lambda_2 \lambda_4 \ldots \lambda_n$) is affected by each optical router and the optical shutters (It is to be understood that the optical multiplexed input signal may or may not contain all channels of an N channel optical network). In this illustrative embodiment, the optical multiplexed signal is first demultiplexed in optical router 104. As shown in FIG. 2, each channel present in the multiplexed signal is propagated in respective pairs of waveguides 106 and 108. For example, channel $\lambda_1$ is present in the optical multiplexed input signal and is propagated in respective pairs of input waveguides 106 and 108, namely $106_1$ and $108_1$. Moreover, channel $\lambda_3$ is not present in the optical multiplexed input signal. Therefore, a channel is not propagated in input waveguides $106_3$ and $108_3$, wherein a dash ("–") is used to indicate where no channel is present in a particular waveguide. By using waveguides 106 and 108 in this manner, the so-called drop and continue function is implemented in the WADM arrangement because all of the channels are simultaneously dropped (using waveguides 108) at a particular network node and may continue (using waveguides 106) to further network nodes in an optical network.

Responsive to a control signal received by lead 118, each attenuator-switch 120 is configured in one of two states, namely opened or closed, corresponding to channels that will be passed through unchanged or dropped. For example, attenuator-switch $120_1$ is configured in an open state (represented by horizontal lines in FIG. 2), thus channel $\lambda_1$ is passed through to waveguide $112_1$ of optical router 110. Attenuator-switch $120_2$, however, is configured in a closed state (represented by vertical lines in FIG. 2), thus channel $\lambda_2$ is absorbed and thereby prevented from reaching waveguide $112_2$ of optical router 110. Lastly, waveguides corresponding to channel components not present, for example $\lambda_3$, in the optical multiplexed input signal can be configured in either state.

Waveguides 114 are used to input channels, for example, as shown in FIG. 2, channels $\lambda_2$ and $\lambda_3$ are input to the WADM arrangement using waveguides $114_2$ and $114_3$ of optical router 110 (as above, a dash is used to indicate that no channel is being added, e.g., waveguides $114_1$ and $114_4$). Thereafter, the optical channels propagating within waveguides 114 and 112 are multiplexed in optical router 110 to produce a new optical multiplexed signal $\lambda_1 \lambda_2 \lambda_3 \ldots \lambda_N$.

Figure 3:
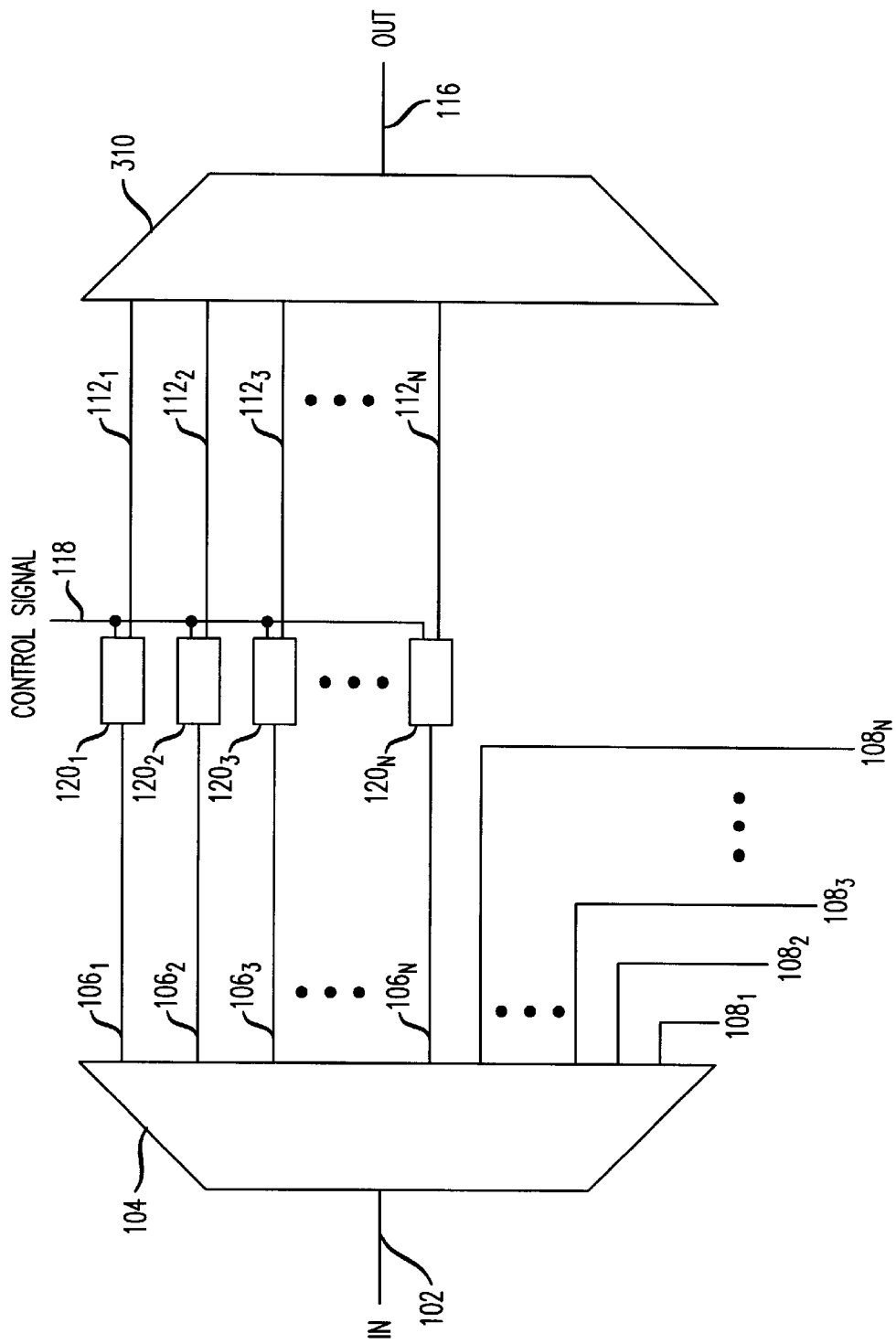
FIG. 3 shows a block diagram of an exemplary configuration of the present invention for selectively dropping optical channels.

FIG. 3 shows another illustrative embodiment for selectively dropping optical channels, which includes all of elements of the WADM arrangement shown and described in FIG. 1 except that the arrangement includes only one duplicated-port waveguide grating router (DWGR) 104. The other optical router is a conventional waveguide grating router (WGR) 310 (i.e. the ports are not duplicated). DWGR 104 is configured as a 1×2N demultiplexer, which demultiplexes an optical multiplexed signal into a duplicated plurality of channels. WGR 310 is configured as an N×1 multiplexer. Once all of the appropriate drops are accomplished, in a similar manner as described with regard to the operation of the embodiment of FIG. 1, the channels propagating in input waveguides $112_1$ through $112_N$ are multiplexed by WGR 310. This embodiment illustrates the "drop and continue" functionality, wherein channels are both dropped at a particular node and may also continue to further nodes in an optical network.

Figure 4:
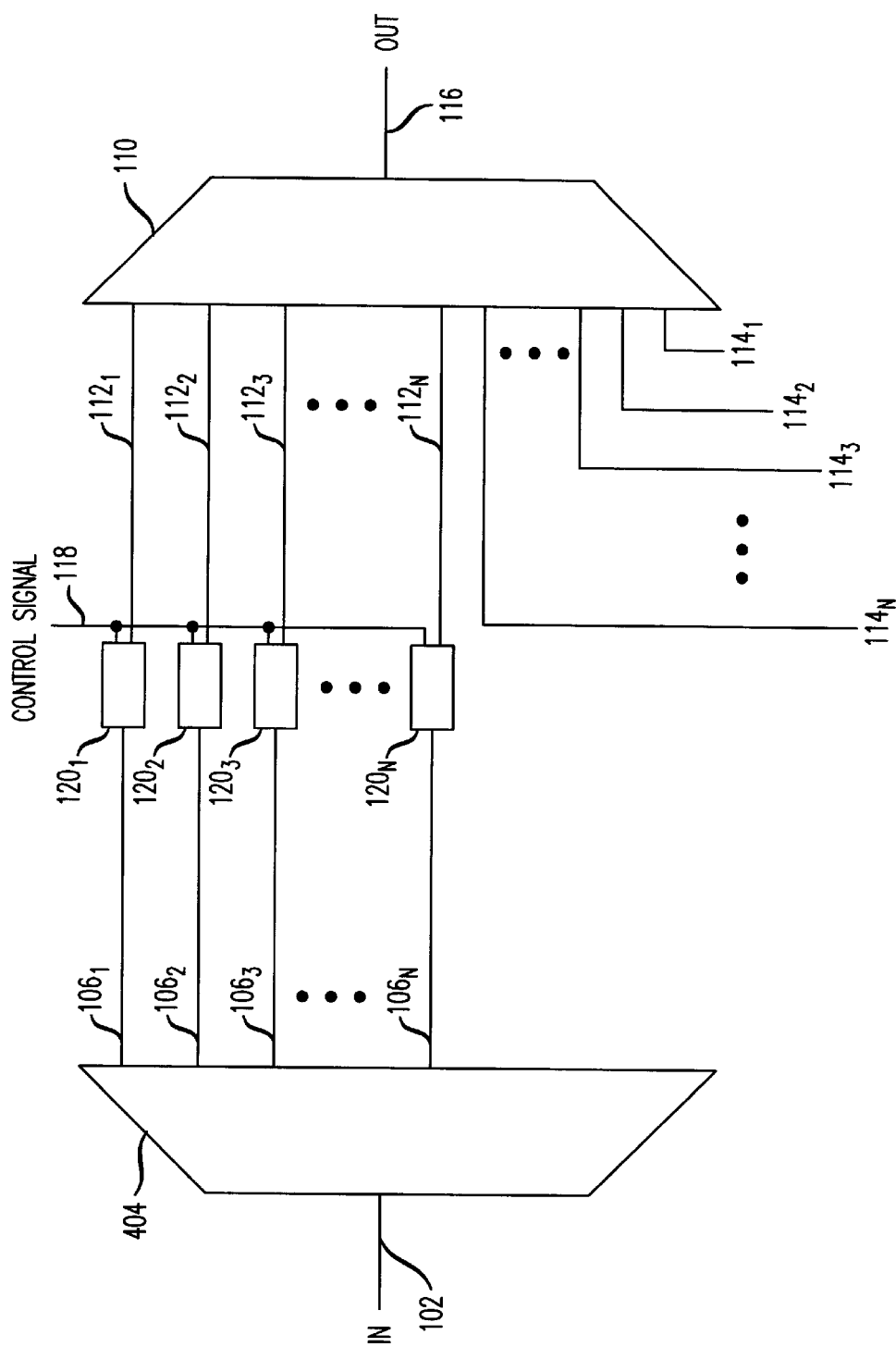
FIG. 4 shows a block diagram of one exemplary configuration of the present invention for selectively adding/substituting optical channels.

FIG. 4 shows another illustrative embodiment for selectively adding/substituting optical channels, which again includes all of elements of the WADM arrangement shown and described in FIG. 1 except, as in FIG. 3, the arrangement includes only one duplicated-port waveguide grating router (DWGR) 110. The other optical router is a conventional waveguide grating router (WGR) 404 (i.e. the ports are not duplicated). WGR 404 is configured as a 1×N demultiplexer, which demultiplexes an optical multiplexed signal into a single plurality of channels. DWGR 110 is configured as a 2N×1 multiplexer. Once all of the appropriate adds/substitutions are accomplished, in a manner similar as described with regard to the operation of the embodiment of FIG. 1, the channels propagating in input waveguides $112_1$ through $112_N$ and $114_1$ through $114_N$ are multiplexed by DWGR 110. This embodiment illustrates the adding/substituting functionality.

Figure 5:
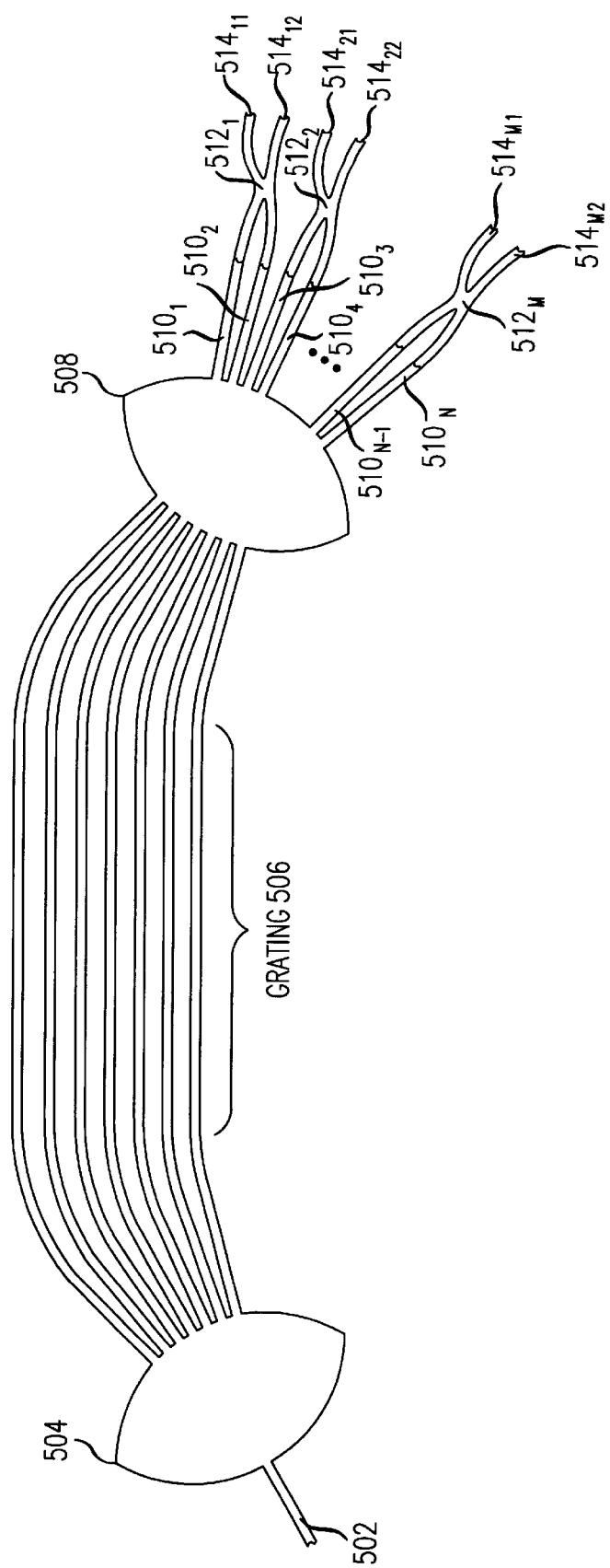
FIG. 5 shows a schematic diagram of an exemplary WGR used in the embodiment of FIG. 1.

The optical routers 104 and 110 of FIGS. 1 through 4 can be any known optical router (also commonly known as a frequency routing device) that has duplicated input or output ports. For example, FIG. 5 shows one type of optical router that can be used. The optical router of FIG.5 is described in application Ser. No. 09/409,463 filed concurrently, and which is incorporated by reference herein, whose applicants are the same as the applicants of the present application and whose assignee is the same as the present application. The optical router of FIG. 5 is a duplicated-port waveguide grating router (DWGR) and can be used as a 1×2N demultiplexer or as a 2N×1 multiplexer, which correspond to optical router 104 and optical router 110 of FIGS. 1 through 4, respectively. The use of the particular optical router described in the indicated application is particularly advantageous since the optical router provides duplicated (input or output) waveguides with substantially identical, largely flat passband spectral responses.

Briefly, when the optical router of FIG. 5 is used as a 1×2N demultiplexer, the optical router includes an input waveguide 502, a first free space region 504, an optical grating 506, a second free space region 508, a plurality of output waveguides $510_1$ through $510_N$ (hereinafter known collectively as output waveguides 510) and a plurality of 2×2 couplers $512_1$ through $512_M$, (hereinafter known collectively as 2×2 couplers 512) with each coupler having two output waveguides, for example, $514_{11}$ and $514_{12}$ (hereinafter known collectively as output ports 514). Each 2×2 coupler couples two adjacent output waveguides 510 to produce substantially identical spectral responses in each of the respective output ports 514. Each coupler may be, for example, an evanescent coupler, multi-mode interference coupler, star coupler or the like, in which the coupler has two input ports and two output ports.

Since waveguide grating routers have reciprocal properties, when the waveguide grating router of FIG. 5 is used as a 2N×1 multiplexer, the waveguide grating router would be operated in reverse and the output ports 514 of 2×2 couplers 512 would serve as the input waveguides and the input waveguide 502 as the output port of the waveguide grating router.

By using the optical router of FIG. 5, the WADM arrangement of the present invention achieves full add/drop as well as drop and continue capability without unnecessary additional elements as taught in the prior art. For example, as described in an article written by C. R. Giles et al., entitled "Reconfigurable 16-Channel WDM DROP Module Using Silicon MEMS Optical Switches" published in Photonics Technology Letters Vol. 11, NO. 1 on January, 1999, a drop and continue WADM apparatus was implemented with external 3 dB fiber couplers (at the expense of increased through-loss of the WADM).

Referring now to the other elements in FIGS. 1–4, advantageously, in a preferred embodiment, the attenuator-switches 120 are optical shutters, for example, microelectromechanical system (MEMS) optical shutters. The optical shutters could also be integrated with the optical routers as thermo-optic switches (as well as flip-chip bonded MEMS optical shutters). Alternatively, arrays of optical shutters could be separately packaged and connected through optical fibers to the optical routers. The shutter is designed to completely reflect incident light. Alternatively, it is feasible, when desired, to move the shutter only enough so that some light is transmitted and some light is reflected to be extracted in a suitable manner for transfer to an auxiliary waveguide. For example, the shutter may be made to redirect the reflected light either into alternative waveguides or back into source waveguides. Alternatively, some optical shutters could be made to both transmit and reflect, with an equivalent effect. Additionally, MEMS devices can be used as variable optical attenuators with analog control to equalize or vary the desired signal level of individual channels as desired.

MEMS is a technology that exploits lithographic mass fabrication techniques of the kind that are used by the semiconductor industry in the manufacture of silicon integrated circuits. Generally, the technology involves forming a multilayer structure by sequentially depositing and shaping layers on a silicon substrate. Layers typically include a plurality of polysilicon layers that are separated by layers of silicon oxide and silicon nitride. The shaping of individual layers is generally done by photolithographic techniques of the kind involved in silicon device manufacture. The technology may also involve the etching of intermediate sacrificial layers of the wafer to release overlying layers for use as flexible elements that can be easily moved. MEMS technology is discussed in a paper entitled "MEMS the Word for Optical Beam Manipulation" published in *Circuits and Devices*, July 1997, pp. 11–18.

MEMS devices can be made to order by the MCNC MEMS Technology Application Center, Research Triangle Park, NC 27709. The technology is described in "Multiuser MEMS Processes (MUMPS) Introduction and Design Rules," Rev. 4, Jul. 15, 1996 MCNC MEMS Technology Applications Center, Research Triangle Park, NC 27709 by D. Keoster et al.

Using a duplicated-port optical router and a unique configuration, the WADM arrangement is able to provide both a drop and continue and conventional add/drop functionality, without certain limitations of the prior art. In addition, the WADM arrangement of the present invention is able to eliminate elements, namely optical switches, used in conventional WADM configurations that contribute significant cost within optical networks.

The exemplary embodiment of the invention described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a person skilled in the art without departing from the teachings of this invention.

We claim:

1. An add/drop optical multiplexing arrangement for dropping at least one channel of an optical multiplexed signal, the arrangement including:

a first optical router having a duplicated plurality of output waveguides, said first optical router for demultiplexing said optical multiplexed signal, wherein a first one of said duplicated plurality of output waveguides is used for dropping said at least one channel;

a second optical router having a first plurality of input waveguides, wherein respective waveguides of said first plurality of input waveguides are coupled to respective waveguides of a second one of said duplicated plurality of output waveguides, said second optical router for multiplexing channels in said first plurality of input waveguides; and at least one optical attenuator switch connected between one of said coupled waveguides, said at least one optical attenuator switch responsive to a control signal for preventing a channel of said first plurality of channels from reaching said first plurality of input waveguides when said optical attenuator switch is configured in a closed state.

2. The add/drop optical multiplexing arrangement of claim 1 further for adding at least one channel to said optical multiplexed signal, wherein said second optical router further includes a second plurality of input waveguides for adding channels, said second plurality of input waveguides is a duplicate of said first plurality of input waveguides; and wherein said second optical router multiplexes channels in said first and second plurality of input waveguides.

3. The add/drop optical multiplexing arrangement of claim 2, wherein respective pairs of said first and second plurality of input waveguides of said second optical router have substantially identical spectral filtering characteristics.

4. The add/drop optical multiplexing arrangement of claim 3, wherein said at least one optical attenuator switch prevents a channel from reaching said first plurality of input waveguides and said second plurality of input waveguides adds another channel having a carrier frequency substantially equal to, and a modulation different from, the channel prevented from reaching said first plurality of input waveguides.

5. The add/drop optical multiplexing arrangement of claim 2, wherein said second plurality of input waveguides adds a channel to said add/drop optical multiplexing arrangement corresponding to a channel absent from said optical multiplexed signal.

6. The add/drop optical multiplexing arrangement of claim 1, wherein respective pairs of said duplicated plurality of output waveguides of said first optical router have substantially identical spectral filtering characteristics.

7. The add/drop optical multiplexing arrangement of claim 1, wherein said first and second optical routers are waveguide grating routers.

8. The add/drop optical multiplexing arrangement of claim 7, wherein said at least one optical attenuator switch is an optical shutter.

9. The add/drop optical multiplexing arrangement of claim 8, wherein the at least one optical shutter is a micro-electromechanical system optical shutter (MEMS).

10. The add/drop optical multiplexing arrangement of claim 8 further including a means for controllably attenuating one or more of said first plurality of channels.

11. The add/drop optical multiplexing arrangement of claim 7, wherein the at least one optical shutter is integrated with the first and second optical routers as a thermo-optic switch.

12. An add/drop optical multiplexing arrangement for adding at least one channel to an optical multiplexed signal, the arrangement including:

a first optical router having a first plurality of output waveguides, said first optical router for demultiplexing said optical multiplexed signal;

a second optical router having a duplicated plurality of input waveguides, wherein respective waveguides of a first one of said duplicated plurality of input waveguides are coupled to respective waveguides of said first plurality of output waveguides, and a second one of said duplicated plurality of input waveguides for adding channels, said second optical router for multiplexing channels in said first and second plurality of input waveguides; and at least one optical attenuator switch coupled between one of said coupled waveguides, said at least one optical attenuator switch responsive to a control signal for preventing a channel of said first plurality of channels from reaching said first plurality of input waveguides when said optical attenuator switch is configured in a closed state.

13. The add/drop optical multiplexing arrangement of claim 12 further for dropping at least one channel of said optical multiplexed signal, wherein said first optical router further includes a second plurality of output waveguides for dropping channels, said second plurality of output waveguides is a duplicate of said first plurality of output waveguides; and wherein said first optical router demultiplexes said optical multiplexed signal into a duplicated plurality of channels, wherein a first plurality of said duplicated plurality of channels is propagated in said first plurality of output waveguides and a second plurality of said duplicated plurality of channels is propagated in said second plurality of output waveguides.

14. The add/drop optical multiplexing arrangement of claim 13, wherein respective pairs of said first and second plurality of output waveguides of said first optical router have substantially identical spectral filtering characteristics.

15. The add/drop optical multiplexing arrangement of claim 13, wherein the at least one optical attenuator-switch is an optical shutter.

16. The add/drop optical multiplexing arrangement of claim 15, wherein the at least one optical shutter is a micro-electromechanical system optical shutter (MEMS).

17. The add/drop optical multiplexing arrangement of claim 15, wherein the at least one optical shutter is integrated with the first and second optical routers as a thermo-optic switch.

18. The add/drop optical multiplexing arrangement of claim 12, wherein respective pairs of said duplicated plurality of input waveguides of said second optical router have substantially identical spectral filtering characteristics.

19. A method for dropping at least one channel of a multiplexed optical signal, the method comprising the steps of:

demultiplexing, in a first optical router, said multiplexed optical signal, said first optical router having a duplicated plurality of output waveguides;

dropping at least one of said channels in a first plurality of output waveguides of said duplicated plurality of output waveguides;

configuring at least one optical attenuator switch to a closed state for preventing a channel in a second plurality of output waveguides from reaching a first plurality of input waveguides of a second optical router; and multiplexing, in said second optical router, channels in said first plurality of input waveguides.

20. The method of claim 19 further for adding at least one channel to said optical multiplexed signal, said method further including the step of adding at least one channel, wherein said second optical router further includes a second plurality of input waveguides for adding said at least one channel, said second plurality of input waveguides is a duplicate of said first plurality of input waveguides; and wherein said multiplexing step includes multiplexing channels in said first and second plurality of input waveguides.

21. A method for adding at least one channel to a multiplexed optical signal, the method comprising the steps of:

demultiplexing, in a first optical router having a first plurality of output waveguides, said multiplexed optical signal;

configuring at least one optical attenuator switch to a closed or an open state, said at least one optical attenuator switch both for preventing a channel of said first plurality of channels from reaching a first plurality of input waveguides of a second optical router when said optical attenuator switch is configured in a closed state and for allowing said channel to propagate to said first plurality of input waveguides when said optical attenuator switch is configured in an open state;

adding at least one channel using a second plurality of input waveguides of said second optical router; and multiplexing, in said second optical router, channels in said first and second plurality of input waveguides.

22. The method of claim 21 further for dropping at least one channel of said optical multiplexed signal, said method further including the step of dropping at least one channel, wherein said first optical router further includes a second plurality of output waveguides for dropping said at least one channel, said second plurality of output waveguides is a duplicate of said first plurality of output waveguides; and wherein said first optical router demultiplexes said optical multiplexed signal.

* * * * *